United States Patent
Eberle et al.

(10) Patent No.: US 8,568,073 B2
(45) Date of Patent: Oct. 29, 2013

(54) FASTENING ELEMENT FOR VEHICLE PARTS

(75) Inventors: Diego Eberle, Azmoos (CH); Andreas Wolf, Schwarzenberg (AT); Uwe Korbmacher, Minden (DE); Gerhard Mandjik, Schwarzach (AT)

(73) Assignee: Carcoustics TechConsult GmbH, Leverkusen (DE)

( * ) Notice: Subject to any disclaimer, the term of this patent is extended or adjusted under 35 U.S.C. 154(b) by 955 days.

(21) Appl. No.: 12/223,544

(22) PCT Filed: Feb. 2, 2007

(86) PCT No.: PCT/EP2007/051038
§ 371 (c)(1),
(2), (4) Date: Apr. 14, 2009

(87) PCT Pub. No.: WO2007/088202
PCT Pub. Date: Aug. 9, 2007

(65) Prior Publication Data
US 2010/0047011 A1 Feb. 25, 2010

(30) Foreign Application Priority Data
Feb. 3, 2006 (DE) ..................... 20 2006 001 894 U

(51) Int. Cl.
*F16B 21/18* (2006.01)
*F16B 37/04* (2006.01)

(52) U.S. Cl.
USPC ............. 411/112; 411/526; 24/682.1; 24/662

(58) Field of Classification Search
USPC ......... 411/999, 516, 520, 526, 112, 546, 173, 411/533; 24/293, 295, 457, 297, 662, 24/682.1, 703.1
See application file for complete search history.

(56) References Cited

U.S. PATENT DOCUMENTS 183,324 A * 10/1876 Pratt ............................. 411/134
515,089 A * 2/1894 McClelland .................. 301/114
(Continued)

FOREIGN PATENT DOCUMENTS

| DE | 101 38 354 | 4/2003 |
|----|-----------|--------|
| EP | 1 045 153 | 10/2000 |
| EP | 1 101 957 | 5/2001 |
| GB | 2 317 199 | 3/1998 |

OTHER PUBLICATIONS

International Search Report, Jun. 29, 2007.

*Primary Examiner* — Flemming Saether
(74) *Attorney, Agent, or Firm* — Collard & Roe, P.C.

(57) ABSTRACT

The invention relates to a fastening element (1) for vehicle parts (5), in particular for fastening a heat shield to a bolt shaped fastening means (13) of a vehicle body, preferably an underbody of a motor vehicle, comprising a claw disk (2) and a spring washer (3), held at claws (2.1) of the claw disk, wherein the claw disk (2) comprises an opening (6) and the spring washer (3) can be interlocked with a bolt shaped fastening means (13), wherein the claw disk (2) comprises at least one clip element (8), associated with the opening (6) and oriented away from the spring washer (3), wherein the at least one clip element (8) is configured for insertion through an opening (7) in the vehicle part (5) or in the heat shield, and wherein the at least one clip element (8) comprises an undercut (10) for interlocking the rim portion of the opening (7) of the vehicle part (5) or of the heat shield.

6 Claims, 2 Drawing Sheets

(56) References Cited

U.S. PATENT DOCUMENTS

| | | | | |
|---|---|---|---|---|
| 1,675,791 | A * | 7/1928 | Carr | 24/623 |
| 1,872,014 | A | 8/1932 | Schjolin | |
| 1,881,836 | A * | 10/1932 | Mitchell | 411/173 |
| 2,458,409 | A * | 1/1949 | Paige | 285/154.1 |
| 2,571,394 | A * | 10/1951 | Trafton | 411/112 |
| 3,035,624 | A * | 5/1962 | Jaworski | 411/112 |
| 4,890,966 | A | 1/1990 | Umezawa | |
| 4,986,712 | A * | 1/1991 | Fultz | 411/428 |
| 5,688,091 | A * | 11/1997 | McKinlay | 411/149 |
| 5,871,320 | A | 2/1999 | Kovac | |
| 6,997,662 | B2 * | 2/2006 | Nishikawa | 411/437 |
| 7,128,511 | B2 * | 10/2006 | Hewgill | 411/149 |
| 7,568,868 | B2 * | 8/2009 | Motsch et al. | 411/112 |
| 2005/0135896 | A1 * | 6/2005 | Teal | 411/183 |

* cited by examiner

FASTENING ELEMENT FOR VEHICLE PARTS

CROSS REFERENCE TO RELATED APPLICATIONS

This application is the National Stage of PCT/EP2007/051038 filed on Feb. 2, 2007, which claims priority under 35 U.S.C. §119 of German Application No. 20 2006 001 894.8 filed on Feb. 3, 2006. The international application under PCT article 21(2) was not published in English.

BACKGROUND OF THE INVENTION

1. Field of the Invention

The invention relates to a fastening element for vehicle parts, in particular for fastening a heat shield to a bolt shaped fastening means of a vehicle body, comprising a claw disk and a spring washer, held at the claws of the claw disk, wherein the claw disk comprises an opening and the spring washer can be interlocked with the bolt shaped fastening means. The invention furthermore relates to a vehicle part, provided with such a fastening element, in particular a heat shield.

2. The Prior Art

A fastening element of the type mentioned above is known from DE 101 38 354 C1 and comprises a spring washer, which is fixated in a claw disk, configured as a top component, and a counter piece configured as a bottom component for the claw disk. For mounting the known fastening element at a plate shaped covering, which is to be mounted, the claw disk is initially placed on a bore hole of the covering. Subsequently, the bottom component is interlocked with the claw disk from the other side of the covering. For this purpose, the bottom component comprises a plurality of tongues, provided with interlocking lugs, which are inserted through the bore hole and interlocked on the opposite side of the covering with an outer shoulder of the claw disk configured for this purpose. Subsequently, the spring washer is inserted into the claw disk before the covering is mounted to a threaded bolt of a vehicle body by means of the fastening element.

Unsatisfying with such fastening elements are the relatively high effort for the assembly of the fastening element at the covering or at the vehicle part and the high manufacturing cost for the particular components of the fastening element. In this configuration several components always have to be manufactured in parallel with one another with high precision, in order to be able to exclude problems during subsequent assembly as far as possible. In the context of the assembly of the fastening element at a vehicle component, there is additional improvement potential with respect to the required cycle times. A small reduction of cycle times already leads to a significant improvement of the economics, when the number of mounted fastening elements or the number of vehicle parts, in particular coverings, provided with fastening elements, can be significantly increased overall.

SUMMARY OF THE INVENTION

It is thus the object of the present invention to provide a fastening element of the type described above, which can be assembled more quickly, and which can be produced in a more cost-efficient manner, than this is the case with state of the art fastening elements of said type.

This object is accomplished by a fastening element according to the invention.

Through the at least one clip element, it is possible to place the claw disk onto a vehicle part, in particular a heat shield, in a simple manner. For this purpose, only the at least one clip element has to be inserted through the bore hole. Without additional means, the claw disk, and thus the fastening element as such, interlocks with the vehicle part, since the vehicle part, due to the insertion of the at least one clip element, moves into the portion of the at least one undercut. There, the vehicle part is held towards both sides against unintentional disengagement of the interlocking connection.

With other words, the fastening element can be connected from only one side to the vehicle part to be mounted, e.g. to a heat shield or to a sound insulating covering. A complicated connection of two components at opposite sides of the vehicle part to be fastened is not necessary anymore. It is sufficient to press the fastening element from one side into a suitable bore hole of the vehicle part. Thus, the at least one clip element and/or the vehicle part are at least partially elastically deformed. After the fastening element is inserted through the opening, said deformation recedes at least partially, and the vehicle part enters the undercut at least in sections. Therefore, this can also be called "clipping" the fastening element in.

The fastening element is subsequently connected to the vehicle part, so it cannot be lost, since the connection can only be disengaged by a new deformation. For this purpose, however, forces are required which are significantly greater than the forces which impact the fastening element, when mounting the vehicle part to the body of a motor vehicle.

This, however, does not preclude that the fastening element can be separated again by a targeted imparting of a force, which is opposite to the force for connecting the fastening element to the vehicle part, and subsequently reused, or that it can be replaced by another fastening element. Eventually, also a significantly higher flexibility with respect to a possible removal of the fastening element is achieved by the invention.

It is furthermore advantageous with respect to the invention, that only two components are required now to form a fastening element, which can be interlocked with a bolt, in particular with a threaded bolt. Since overall fewer components have to be produced and thus also less material is required, there is significant cost savings. As previously discussed, these savings are also not consumed by increased assembly complexity. Just the opposite is the case.

The invention is not limited to fastening elements for particular vehicle parts, in particular coverings. However, fastening elements according to the invention are advantageous in particular for mounting heat shields and sound absorbers, since they are often mounted by pushing fastening elements as mentioned above onto bolts, in particular threaded bolts, or profile bolts, comprising grooves. Consequently, the fastening means is also preferably such a bolt, though also other fastening means known in the state of the art and suitable for the respective application are also conceivable.

Furthermore, the fastening element is particularly preferred for mounting a covering to an underbody of a motor vehicle. There, in particular, heat shields can be disposed in the proximity of hot components of the exhaust, in order to protect the underbody or adjacent components from heat. Furthermore, also coverings configured as sound absorbers, adjacent to sound sources, can be mounted there by means of one or several fastening elements according to the invention, in order to reduce the sound level in the interior of the motor vehicle.

In a particularly preferred embodiment of the fastening element, the at least one clip element is extended as a spacer piece between the undercut and the free end. In this way, a minimum distance between the vehicle component and the vehicle body is assured. This is advantageous, in particular, when metal coverings, in particular heat shields, are mounted to a vehicle body, which is also made of metal. In particular, when using different metals, this safely precludes the risk of contact corrosion.

A preferred embodiment of the fastening element according to the invention provides, that the free end of the at least one clip element protrudes by a length relative to a section of the claw disk, which is intended for contacting the vehicle part or the heat shield, which length is at least twice the thickness of the interlocked rim portion of the vehicle part or heat shield.

In another preferred embodiment, the fastening element comprises at the free end of the at least one clip element a preferably annular contact surface for contacting the vehicle body. This contact surface assures that the possibly desired distance between the vehicle body and the vehicle part mounted thereon is safely maintained. If the fastening element, on the other hand, were only supported at the vehicle body in a punctiform manner, the support could slide or bend, which can reduce the distance between the vehicle part and the vehicle body to an unacceptable condition.

In order to be able to perform the assembly of the fastening element without increased effort, it is helpful that the claw disk comprises a contact surface outside of the opening for contacting the vehicle part to be mounted, and that the at least one clip element protrudes outward and perpendicular to the contact surface. Thus, e.g. two sides of the fastening element can be provided, which are separate from one another, wherein one is configured for receiving the spring washer, and the other one is configured for inserting and clipping into the opening. These two sides are then eventually separated from one another by the contact surface. Thus furthermore, none of the portions of the fastening element can cause a restriction with respect to the functionality of the other respective portion.

When the fastening element according to the invention comprises several clip elements, then it is useful in particular that the clip elements are provided evenly distributed over the circumference of the opening. Thus, the forces transferred to the fastening element can be evenly transferred to the vehicle part without load spikes and vice versa.

In order to increase the forces which are required for separating the fastening element from the vehicle part again, the at least one clip element can be formed as a substantially closed collar. This means that the collar substantially has a closed form, similar to a tubular section or the like.

The collar can be configured so that it comprises a slot or several slots, whose width is reduced due to the deformation of the collar when passing the fastening element through. When several slots are provided, these are in turn preferably evenly distributed over the circumference of the collar. The collar, however, can also be configured completely closed, which among other things has the advantage that the collar then has preferred properties with respect to its function as a spacer part. Through the closed shape, which is preferably a cylindrical shape, the collar can absorb large forces without incurring the risk of a deformation, and in conjunction therewith, an undershooting of the minimum distance between the vehicle part and the vehicle body.

Thus, it is advantageous in principle, in particular in case of a vehicle body with a non-planar surface, when the contact surface at the free end of the collar is as large as possible. Thus, the risk of sliding or deformation is reduced. This applies, irrespective of the fact, if the collar comprises one slot or several slots or none. Also, in case of only single clip elements, a larger contact surface at their free ends can be advantageous.

In a further preferred embodiment of the fastening element, the undercut is provided completely circumferential at the collar. Such collars are simple to produce and lead to a consistent force impact onto the vehicle part, when joining, or onto the fastening element, and to a consistent force distribution, when external forces impact the components connected to the vehicle body. Irrespective of that, however, it can be advantageous in a particular case, when the undercut is partially interrupted. Under certain circumstances, also the rim of the bore hole of the vehicle part to be mounted can then be provided with protrusions or recesses, corresponding to the undercut. Hereby, it is possible to avoid a rotation of the fastening element and the mounted vehicle component.

For inserting (interlocking) of the collar, it is preferred when the collar comprises at least one bead forming the undercut. Certainly, alternatively or additionally, also a contraction of the collar can be performed at a collar, in order to configure an undercut. In most cases it is, however, preferred when a bead is formed. Said bead is preferably generated by a local expansion of the circumference of the collar.

In particular, in the context of using the vehicle part as a heat shield, it is helpful, when the claw disk or even the entire fastening element is made of aluminum or made of an aluminum material. Since aluminum is a comparatively expensive material, the advantages with respect to the economical manufacturing cost of the fastening element come to bear in particular.

Another object of the present invention is furthermore a vehicle part, in particular a heat shield, comprising a bore hole and a fastening element, interlocked in the bore hole according to the invention.

BRIEF DESCRIPTION OF THE DRAWINGS

Subsequently, the invention is described in more detail with reference to a drawing illustrating an embodiment. In the drawing shows.

DETAILED DESCRIPTION OF THE PREFERRED EMBODIMENTS

Figure 1:
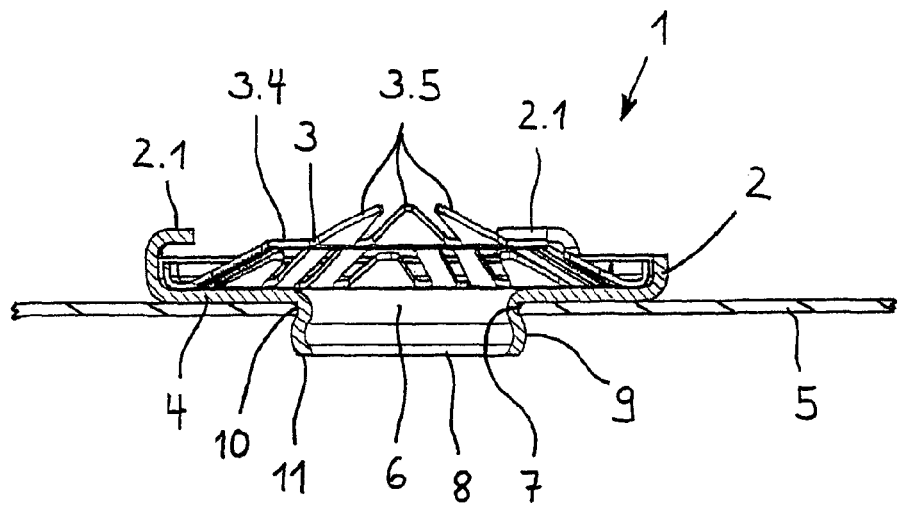
FIG. 1 a fastening element with a section of a vehicle component to be fastened in a sectional view along the line A-A of FIG. 2.

FIG. 1 illustrates a fastening element 1, which is comprised of two components, thus a claw disk 2 and a spring washer 3. The claw disk 2 comprises a disk shaped, flat contact surface 4, which contacts a vehicle part 5 to be fastened, e.g. a sound absorbing covering or a heat shield. The component designated as 5 can be in particular a carrier plate of a heat shield comprising plural metal foils.

Figure 2:
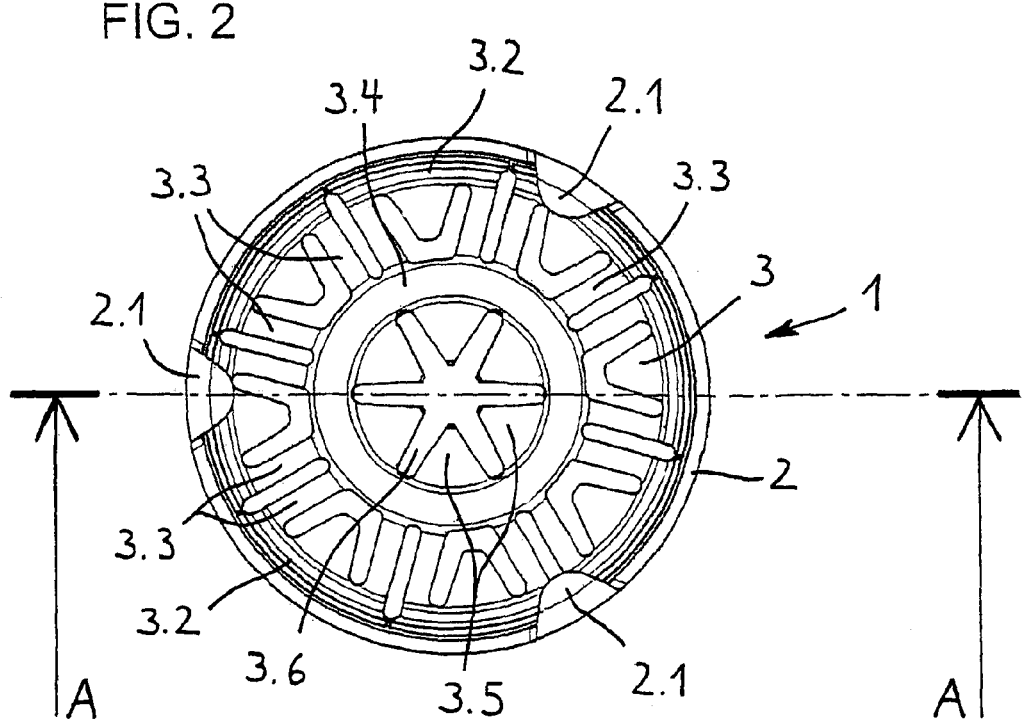
FIG. 2 the fastening element of FIG. 1 in top view.

The claw disk 2 comprises a central opening 6, which substantially coincides with an opening or a bore hole 7 in the vehicle part 5. Above the contact surface 4 of the claw disk, there is a receptacle for inserting the spring washer 3, which is held by three bending ears 2.1, evenly distributed about the circumference of the claw disk 2. This is evident in particular from FIG. 2.

The spring washer 3 comprises radially outward facing support lugs 3.2, which are connected to an inner circumferential ring part 3.4 through spring legs 3.3. Radially inward facing snap-in lugs 3.5 are formed at the ring part 3.4, wherein said snap-in lugs define an approximately star shaped recess 3.6 between one another.

The snap-in lugs 3.5 are configured spring resilient, like the spring resilient legs 3.3. Certainly, the configuration of the spring washer 3 is not limited to the illustrated shape. The spring washer 3 can also comprise snap-in lugs with other shapes, which possibly do not define a star shaped recess 3.6 but e.g. an oval or an elliptical recess. By the same token, plural snap-in lugs evenly distributed about the circumference do not have to be provided, but it can also be enough to provide e.g. only two snap-in lugs opposite to one another, which define a respective recess between one another.

Before the spring washer 3 is inserted into the receptacle of the claw disk 2, the bending ears (claws) 2.1 initially protrude substantially vertically from the flat contact surface 4. After the spring washer 3 is inserted, the claws 2.1 are bent in the direction of the opening 6, so that the spring washer 3 is connected to the claw disk 2 so it cannot be lost. The claw disk 2, in particular the position of the bent bending ears 2.1, is dimensioned so that the inserted spring washer 3 is held rotatably in the claw disk 2.

The opening 6 of the claw disk 2 is surrounded by a collar 8, which protrudes perpendicular to the disk shaped section 4 to the outside and faces away from the spring washer 3. The collar 8 is provided as a clip element. It comprises a bead 9 and an undercut 10. In the fastening element 1, which is illustrated here in already completely assembled state, the collar 8 extends completely through the opening or the bore hole 7, while the remaining components of the claw disk 2, i.e. the contact surface 4 and the receptacle for the spring washer 3, are disposed on the opposite side of the vehicle part 5.

The fastening element 1 is configured substantially rotationally symmetrical. Accordingly, the opening 7 in the vehicle part 5 is circular, and the collar 8 of the claw disk 2 is cylindrical, when the bead 9 and the undercut 10, subsequent thereto, are not considered. This configuration is preferred but not required.

The bead 9 of the collar 8 is formed by expanding the diameter of the collar 8 at one location. This is performed preferably by a plastic deformation of the collar 8 from the inside. The undercut 10 is formed adjacent to the bead 9 on the side facing towards the spring washer 3 by the expansion of the collar 8.

The distance between the contact surface 4 and the bead 9 is selected in such a way that it approximately corresponds to the thickness of the vehicle part 5. The distance can certainly also be selected slightly smaller than the thickness of the vehicle part 5.

FIG. 1 furthermore shows that the collar 8 is configured longer than it would be required for actually clipping the fastening element 1 into the opening 7 of the vehicle part 5. Through this excess length, which has the function of a spacer piece, it is assured that the vehicle part 5 is disposed in assembled state at a distance to the vehicle body carrying it (cf. FIG. 3). At the free end of the collar 8, a contact surface 11 for contacting a vehicle body panel 12 is provided.

Figure 3:
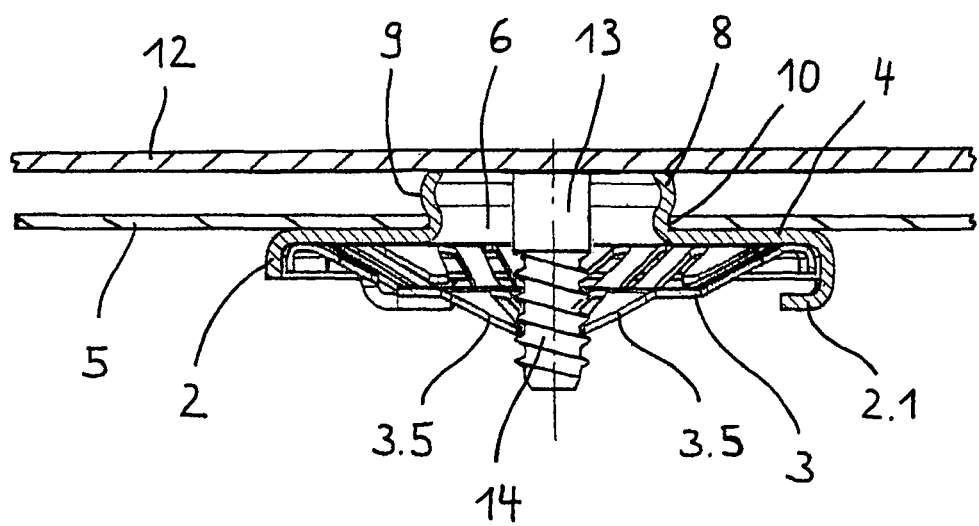
FIG. 3 the fastening element of FIG. 1 in conjunction with a threaded bolt, mounted to a vehicle body.

In FIG. 3, the fastening element 1 is illustrated in conjunction with a threaded bolt (mounting stud) 13, which is mounted to a body panel 12. FIG. 3 shows that the fastening of the thread 14 in the spring washer 4 is always performed under a preload by the spring legs 3.3 and the snap-in lugs 3.5 pulling on the bolt 13, and thus pulling on the mounting portion of the body panel 12, which is thereby connected to the vehicle part 5 under a respective preload.

Implementing the invention is not limited to the embodiment described above. In fact, many variations are possible, which, though different in configuration, practice the invention as defined in the patent claims. Thus, e.g. the clip element provided as a closed collar 8 can also be provided with one or several slots, which can then be disposed evenly distributed about the circumference of the opening.

The invention claimed is:

1. A fastening element for fastening a heat shield to a bolt shaped fastener of a vehicle body,
    comprising a claw disk having at least two claws and a spring washer, held by the at least two claws of the claw disk,
    wherein the claw disk comprises an opening and the spring washer can be interlocked with the bolt shaped fastener, wherein
    the claw disk comprises at least one clip element associated with the opening and oriented away from the spring washer,
    wherein the at least one clip element is configured for insertion through a perforation in a vehicle part, or in the heat shield;
    wherein the at least one clip element is configured as a completely closed collar having a cylindrical shape and having a diameter, said collar protruding perpendicular to the claw disk and comprising at least one bead formed by an expansion of the diameter of the collar at one location and forming an undercut adjacent to the at least one bead on a side facing towards the spring washer by the expansion of the collar for interlocking with the rim portion of the perforation of the vehicle part or of the heat shield, the undercut being provided completely circumferential at the collar, and
    wherein the at least one clip element is extended as a spacer part between the undercut and the free end and the undercut is configured to interlock with the vehicle part or the heat shield without additional instrumentalities when the at least one clip element is pushed into the perforation from one side.

2. The fastening element according to claim 1, wherein the free end of the at least one clip element protrudes relative to a section of the claw disk intended for contacting the vehicle part or the heat shield by a length which is at least twice the thickness of the interlocked rim portion of the vehicle part or of the heat shield.

3. The fastening element according to claim 1, wherein the at least one clip element is configured for insertion through a perforation in a vehicle part and the undercut interlocks with the rim portion of the perforation of the vehicle part and wherein at the free end of the at least one clip element, a contact surface for contacting the vehicle body is provided.

4. The fastening element according to claim 3, wherein
    the claw disk comprises a flat section outside of the opening for contacting the vehicle part; and
    the at least one clip element protrudes outward substantially perpendicular to the contact surface.

5. The fastening element according to claim 1, wherein the claw disk is formed from aluminum or from an aluminum material.

6. An assembly comprising a vehicle part comprising at least one perforation and a fastening element interlocked in the at least one perforation for fastening a heat shield to a bolt shaped fastener of a vehicle body, said fastening element comprising a claw disk having at least two claws and a spring washer, held by the at least two claws of the claw disk,
    wherein the claw disk comprises an opening and the spring washer can be interlocked with the bolt shaped fastener,
    wherein the claw disk comprises at least one clip element associated with the opening and oriented away from the spring washer, wherein the at least one clip element is configured for insertion through the perforation;

wherein the at least one clip element is configured as a completely closed collar having a cylindrical shape and having a diameter, said collar protruding perpendicular to the claw disk and comprising at least one bead formed by an expansion of the diameter of the collar at one location and forming an undercut adjacent to the at least one bead on a side facing towards the spring washer by the expansion of the collar for interlocking with the rim portion of the perforation, the undercut being provided completely circumferential at the collar; and wherein the at least one clip element is extended as a spacer part between the undercut and the free end and the undercut is configured to interlock with the vehicle part or the heat shield without additional instrumentalities when the at least one clip element is pushed into the perforation from one side.

* * * * *

UNITED STATES PATENT AND TRADEMARK OFFICE
CERTIFICATE OF CORRECTION

PATENT NO.           : 8,568,073 B2                                                        Page 1 of 1
APPLICATION NO.  : 12/223544
DATED                   : October 29, 2013
INVENTOR(S)         : Eberle et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1328 days.

Signed and Sealed this

Fifteenth Day of September, 2015

Michelle K. Lee
*Director of the United States Patent and Trademark Office*